United States Patent Office 2,705,835
Patented Apr. 12, 1955

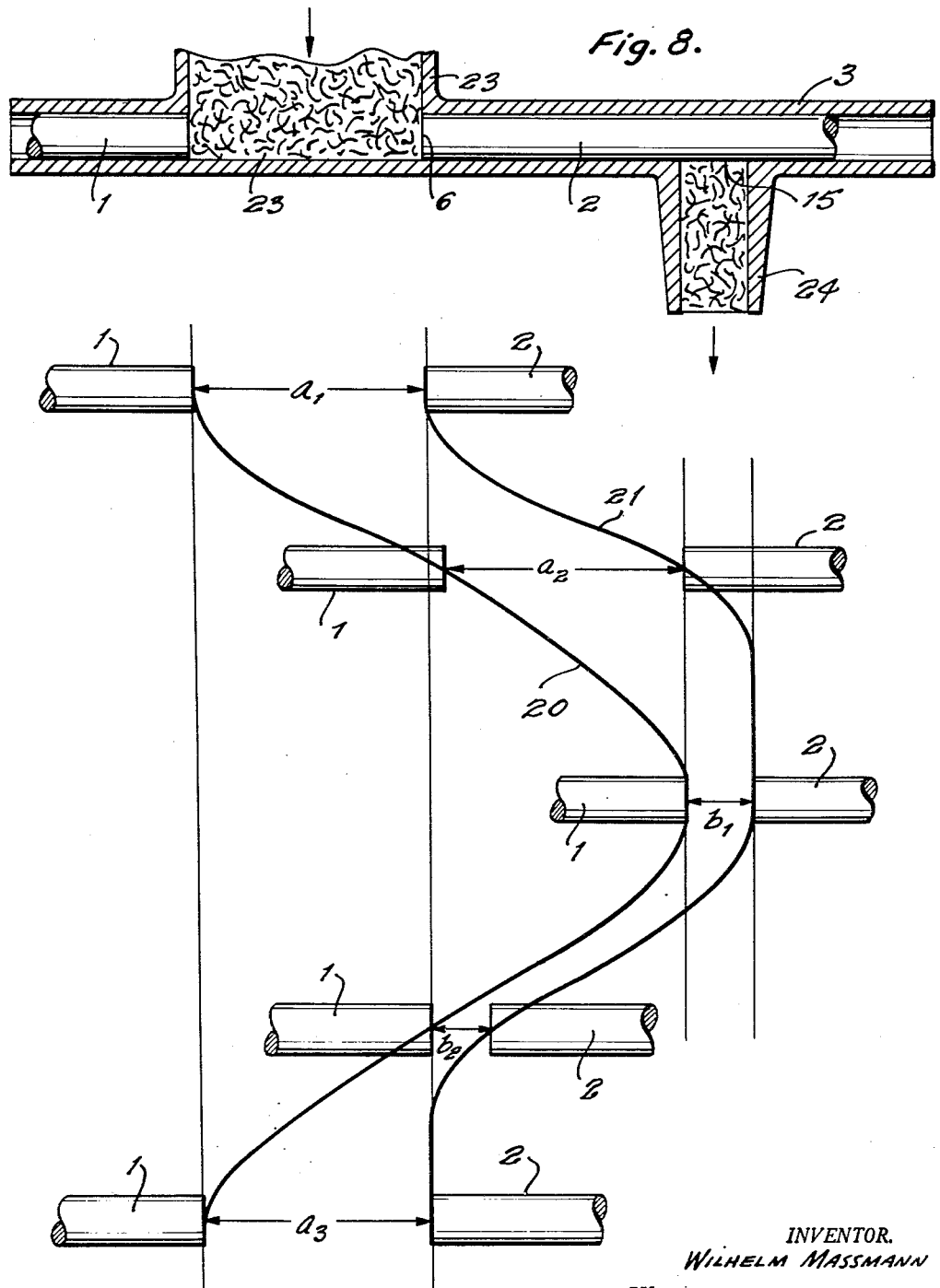

2,705,835

BUTTER HANDLING APPARATUS

Wilhelm Massmann, Duesseldorf, Germany, assignor to Benz & Hilgers Maschinenfabrik, Duesseldorf, Germany, a firm Application May 17, 1950, Serial No. 162,461

3 Claims. (Cl. 31—8)

This invention concerns butter-shaping and packaging machines.

It is an object of the invention to provide a dosing and filling apparatus for such machines which compared with the known dosing and filling apparatus renders a considerably higher output and precision in the goods filled.

Dosing and packaging apparatus are already known, in which the goods are delivered from the feeding container by one or two rotating endless screws (for example one left hand and one right hand screw) into the dose chamber between two dosing pistons one behind the other, mutually displaceable, and in which special means are provided to press the dosed goods from the dosing chamber into the filling and packing mould.

These known devices have the disadvantage that the output is small and the weight of the goods filled shows considerable variations.

A further disadvantage of this known kind of apparatus is that the screw conveyors were only activated intermittently and for short periods, that is, when the dosing plungers were in a certain position; the result is that, in each dosing period, the delivery screws rotate for only about one fifth or one quarter of the time and remain still for the rest of the time. This intermittent working of the screws is wasteful of power, gives a consequent turbulent run of the machine as a result, and also demands complicated and costly controlling devices.

It is, therefore, one object of the present invention to provide a dosing and filling apparatus for butter shaping and packing machines, in which the material is guided from a supply funnel by screw means, for example one left-hand and one right-hand screw into a dosing chamber defined by two dosing pistons disposed one behind the other in a cylinder and mutually slidable to and fro, and in which the dosing pistons move at the same speed for most of the distance from the filling to the emptying positions and vice versa, and the distance separating said pistons is changed shortly before the end of each stroke in such a manner that the dosing chamber in the range of the emptying position is reduced in size and on return to the filling position regains its former size.

It is another object of the present invention to provide a device which assures that more butter is available at the emptying position than can be accepted there for packaging, so that the receiving space at the emptying position is always filled.

It is still another object of the present invention to provide a device which results in a smooth running of the machine, instead of an intermittent feed screw drive, and in particular a drive which is uninterrupted and runs correspondingly slower. It is yet another object of the present invention to provide, at the filling position, an auxiliary cylinder provided with a slidable spring loaded piston, into which auxiliary cylinder the material fed by the screw means can be diverted when the dosing chamber becomes full or closed off by one of the dosing pistons, while the feed screw runs on uninterrupted.

The invention will be further described by way of example with reference to the accompanying drawings in which:

Fig. 8 is a fragmentary view of the dosing chamber; and

Fig. 9 is a diagrammatic showing of the piston movement within one complete cycle.

Figure 1:
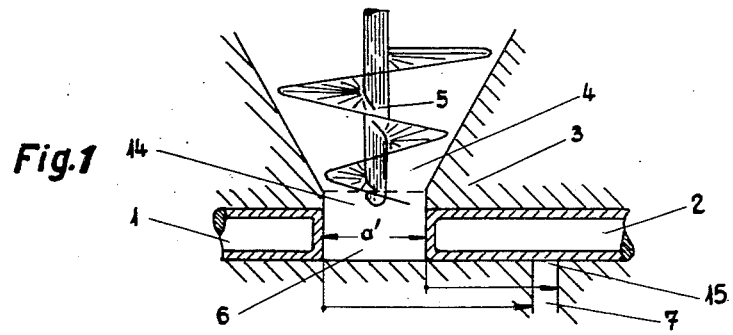
Figs. 1 to 5 illustrate schematically the dosing and packaging mechanism, in five different phases of the drive.

In the drawings, 1 and 2 indicate the two dose feeding plungers, which in the dose cylinder, are connected, the one behind the other and are moved to and fro by a drive and distributing mechanism (not shown).

In Figs. 1, 8 and 9 the two dose-feeding plungers are in their left hand position, and in this position are spaced apart a distance $a_1$, by which distance the size of the dose chamber 6 is defined.

From a filling funnel 4 arranged over the dose chamber, the material is fed through an opening 14 in the wall of the dose cylinder 3 into the dose chamber 6 below, by the feed screw 5.

Figure 2:
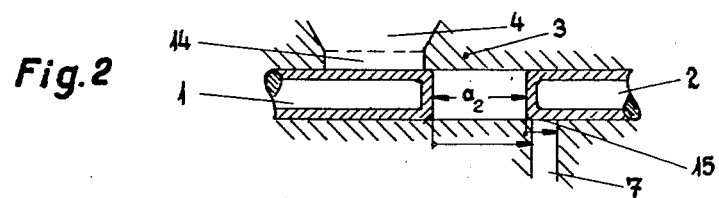

After the filling the dose chamber 6, both plungers 1, 2 move to the right keeping the same spacing $a_2$ ($a_1$ and $a_2$ being identical) whereupon the cylinder opening 14 is closed by the plunger 1 (Figs. 2, 8, 9).

Figure 3:
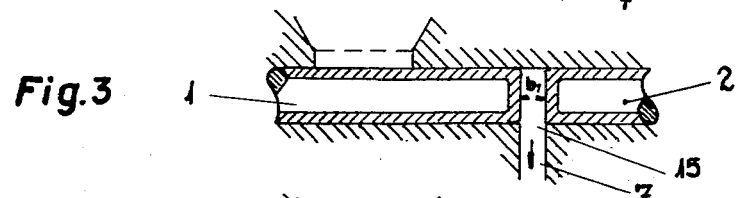
Figure 4:
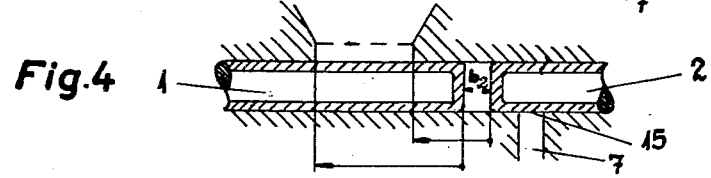

The emptying orifice of the dose cylinder is indicated by 15, which is closed, in Figs. 1 and 2, by the dose plunger 2. After the dose plunger 2 has passed the emptying orifice 15, the plunger 2 comes to rest. The dose plunger 1 on the contrary, continues its movement further, by which the dose chamber diminishes to the width $b_1$ (see Figs. 3 and 9) (see Fig. 3). Hereupon most of the butter between the two dose plungers 1, 2 is pressed through the opening 15 into the filling mould 7.

As soon as the plunger space has diminished to the size $b_1$, the two plungers 1, 2 with the remainder of the butter therebetween move again to the left, the clearance $b$ remaining the same. Thus the butter in the filling mould 7 is separated off, by the return stroke of the piston 2 across the opening 15, and can now be taken out of the filling mould in ready-packed form if necessary. A piece of butter of exact predetermined dose remains in the mold 7 to be fed to a packaging table, as pointed out below. In the further travel of the two pistons 1 and 2, the dosing piston 2 comes to rest when its front surface reaches the right hand edge of the filling opening 14 (Fig. 9) maintaining still the distance $b_2$ from the piston 1 which distance $b_2$ is identical with the distance $b_1$. At this moment the piston 1 has not yet completed its stroke, but travels still further to the left. By this means the dose chamber 6 is again brought to the full width $a_1$, whereupon the sucking action which the dose plunger exerts upon the material in the filling funnel, causes the said dose chamber to be completely filled, with the cooperation of the feed screws 5, until the position shown in Fig. 1 is again reached. The two pistons 1 and 2 then move again to the right, whereupon the sequence of operations already described is repeated.

Figure 5:
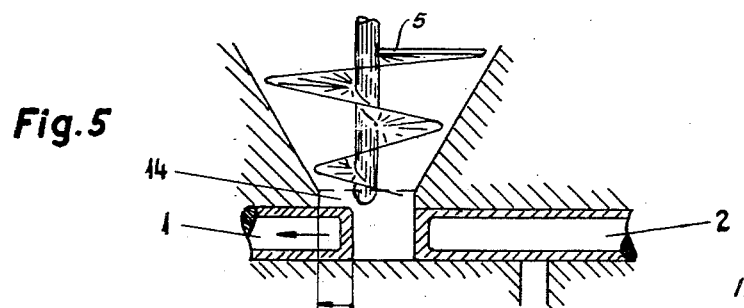

To avoid having the feedscrews working only during the short time, when the dose piston 1 completes its suction operation, the feed screw is run uninterrupted rendering possible that the material which cannot be brought into the dose chamber, is allowed to enter an opening shunt container, under the pressure of the material following, whereupon simultaneously a power feed is loaded, by which the material which cannot be further brought into the feed chamber is not allowed to enter an open funnel mouth, whereupon simultaneously a power feed is set up, by which the material in the shunt container in the funnel mouth or immediately in the feed chamber is reclaimed, when the dose plunger shown in position in Fig. 5, begins to operate.

Figure 6:
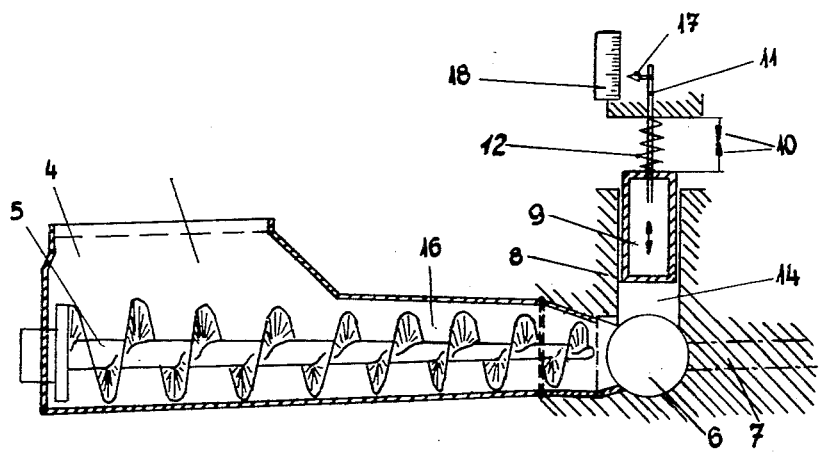
Fig. 6 is a modification of the device shown in Figs. 1 to 5, inclusive.
Figure 7:
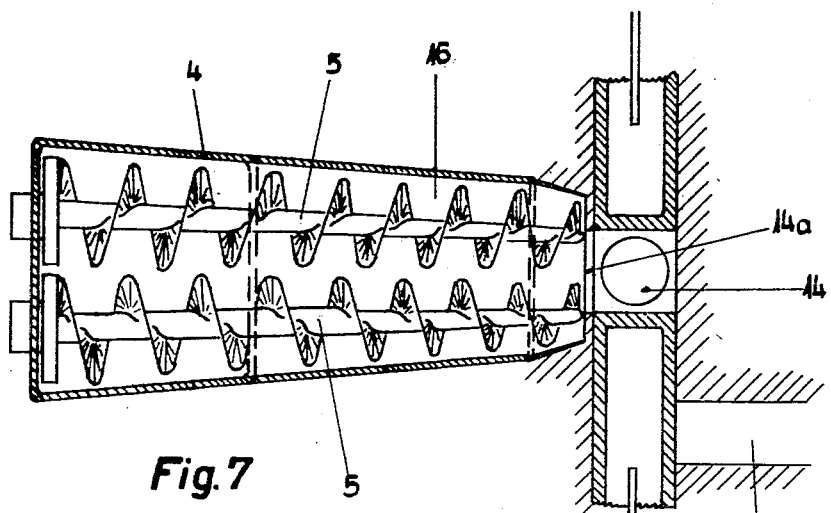
Fig. 7 shows the embodiment of Fig. 6, in horizontal section.

An example for carrying out the arrangement of the shunt containers is illustrated in Figs. 6 and 7. In this mode of execution, the filling funnel 4 is arranged somewhat sideways from the filling opening 14a of the dose cylinder 3, and connected with the latter by a channel 16, in which are the two feed screws 5, one left-hand and one right-hand contra rotating. The axles of the two screws can thus lie in a horizontal plane, or in a plane inclined slightly to the horizontal.

The filling aperture 14 (lying above, according to this embodiment) is widened towards the side, to establish a connection with the laterally disposed channel. Above those parts of the filling mouth 14, as Fig. 6 shows, a cylinder 8 is disposed, in which a plunger 9 can be pressed upwards against the thrust of a spring 12. The stroke of the piston 9 is limited by a fixed buffer 10. The piston rod 11 is guided for movement in the fixed buffer 10, and is provided with a pointer 17 which moves along a scale 18.

In accordance with one feature of the invention, the shunt piston 9 may further be used to control a switch apparatus (not shown), such that, for example, on cessation of the supply of material the machine comes to a standstill, or such that the speed of the feed screws increase or decrease as the driving ratio or conditions of the moment demand.

Although the method of operation has been described above, Fig. 9 shows in a very clear manner the particular operation of the two pistons 1 and 2 in a movement-diagram. The two curved lines 20 and 21 show the position of the oppositely disposed end faces of the pistons 1 and 2 in correspondence with the respective positions of the two pistons in a complete cycle.

In vertical direction, Fig. 9 shows the time within a cycle which indicates the movement of the two pistons 1 and 2 from the original position back to the same position.

In horizontal direction, Fig. 9 shows the respective positions of the pistons 1 and 2 and it will be seen that the uppermost position of the pistons 1 and 2 corresponds exactly with the lowermost position, and also how the start and end of each movement period follow each other. One cycle for performing one dose of the butter corresponds with a complete revolution of the main shaft.

Fig. 8 shows, in correspondence with the diagram of Fig. 9, the two pistons in the dosing cylinder 3 with the entrance opening 23 and the exit opening 24.

The movement diagram of the pistons of Fig. 9 shows that the two pistons 1 and 2 maintain their distance from each other during their travel from the entrance opening towards the exit opening until such time as the piston 1 closes off completely the entrance opening 23 and the piston 2 has partly opened the exit opening. This fact may be seen from the constant horizontal distance between the first part of the curves 20 and 21, so that the distance $a_1$ is identical with the distance $a_2$. In the movement period from $a_2$ to $b_1$ the distance between the pistons 1 and 2 is reduced to a predetermined degree so that the material disposed in the dosing chamber between the pistons 1 and 2 is fed through the exit opening 24 until both pistons 1 and 2 reach the distance $b_1$ therebetween. Then both pistons 1 and 2 start the return movement, maintaining the same distance during the first period of the return movement so that $b_2$ remains identical with $b_1$, until the piston 1 opens up at least partly again the entrance opening 23. From this moment on, in the second return period of the cycle, the distance between the pistons 1 and 2 increases until the distance reaches the measure $a_3$, which is identical with the original distance $a_1$.

Due to the again increased distance between pistons 1 and 2, new material flows through the entrance opening 23 into the dosing chamber 6, partly by suction and partly by operation of the feed screws 5 (Fig. 2) in conjunction with the plunger 9 disposed in the cylinder 8, which plunger 9 is under pressure of the spring 12. The reason why a part of the material is returned from the exit opening 24 to the entrance opening 23 by the piston is mainly for the purpose to ease appreciably the feed of new material completely into the dosing chamber 6 between the pistons 1 and 2. The complete filling of the dosing chamber is somewhat difficult in view of the fact that the material is not liquid but kneadable. A further reason may be seen in the proper filling of the dosing chamber during the change of the piston positions, which filling is thereby simplified.

The two feed screws 5 are driven continuously and independently of each other. They feed the kneadable material into the dosing chamber 6, where the material is received during the increase of the distance between the pistons 1 and 2. During the period in which the entrance opening 23 is closed up by the piston 1, the cylinder 8 receives the material fed during this period by the feed screws 5, to return this material from the cylinder 8 immediately upon withdrawal of the piston 1 and providing access to the dosing chamber through the entrance opening 23.

The amount of material fed by the feed screws 5 during each period is controlled in such manner that always the required dose of material is fed into the dosing chamber. As a safety measure a device may be provided which reduces the amount of feed by the feed screws 5, or causes a complete stop of the latter, which is brought about by electrical or mechanical means (not shown) in case the plunger 9 in the cylinder 8 performs a stroke beyond a predetermined point. This end may be achieved by electrical means, by opening the circuit for the electrical motor 25 driving the feed screws 5, or by mechanical operation of the coupling disposed between the electrical motor 25 and the drive for the feed screws 5.

The kneadable material disposed in the dosing chamber 6 between the pistons 1 and 2 is fed through the exit opening due to the reduced distance between the pistons 1 and 2 at a predetermined point of their travel. The material is fed from the exit opening into the filling mold 7 periodically, where the material forms a longitudinal body which is cut off. The thus longitudinally shaped and cut piece of butter is fed to a packing machine (not shown).

This construction according to the invention has the great advantage, that the filling material is saved and a smooth running of the machine is ensured. Further the construction of the whole apparatus is essentially more simple. Further, the greater precision in weight gives a considerably higher daily output than hitherto possible.

I claim:

1. In a dosing and filling apparatus for butter shaping and packing machines, comprising a cylinder having an inlet and an outlet axially spaced apart from each other, a first and a second piston reciprocating in the said cylinder and spaced apart from each other, the space between the said pistons defining a dosing chamber, means associated with the said pistons for moving the said first piston and the said second piston at first simultaneously in the same direction maintaining their distance and closing the said inlet by means of the said first piston, and the latter continuing its forward stroke, while the said second piston remains stationary upon passing the said outlet, until the said smaller distance between the said pistons at the said outlet is reached, and means associated with the said pistons for moving the latter at first simultaneously in opposite direction maintaining their smaller distance simultaneously closing the said outlet by means of the said second piston and the said first piston continuing its return stroke, while the said second piston remains stationary upon reaching the said inlet, until the said first piston passes the said inlet and assumes again the said first mentioned predetermined distance opposite the said inlet, and an auxiliary cylinder joining said first-mentioned cylinder and disposed adjacent the said first opening of the said first-mentioned cylinder, and a spring-biased plunger reciprocating in said auxiliary cylinder, whereby the material fed uninterruptedly during the period in which the entrance opening into the said first-mentioned cylinder is closed, enters said auxiliary cylinder.

2. The apparatus, as set forth in claim 1, in which the said auxiliary cylinder is disposed immediately above the said first opening of the said first-mentioned cylinder.

3. The apparatus, as set forth in claim 1, which includes a rod attached to and extending from the said plunger and means for guiding said rod, and an indicating means responsive to the position of the said rod in order to indicate the size of the stroke of the said plunger.

References Cited in the file of this patent

UNITED STATES PATENTS

| Number | Name | Date |
| --- | --- | --- |
| 276,828 | Killgore | May 1, 1883 |
| 1,004,399 | Fawcett | Sept. 26, 1911 |
| 1,143,325 | Sherman | June 15, 1915 |
| 1,274,884 | Hudson | Aug. 6, 1918 |
| 1,690,784 | Hilgers | Nov. 6, 1928 |
| 1,849,027 | Pardee | Mar. 8, 1932 |
| 1,955,331 | Howard et al. | Apr. 17, 1934 |
| 2,258,288 | Heft et al. | Oct. 7, 1941 |
| 2,384,163 | Flowers | Sept. 4, 1945 |
| 2,474,136 | Wilson et al. | June 21, 1949 |

FOREIGN PATENTS

| Number | Country | Date |
| --- | --- | --- |
| 282,873 | Great Britain | Dec. 28, 1927 |